United States Patent [19]

Burdick

[11] Patent Number: 4,686,567

[45] Date of Patent: Aug. 11, 1987

[54] TIMING CIRCUIT FOR VARYING THE HORIZONTAL FORMAT OF RASTER SCANNED DISPLAY

[75] Inventor: William S. Burdick, Indialantic, Fla.

[73] Assignee: Sundstrand Data Control, Inc., Redmond, Wash.

[21] Appl. No.: 656,028

[22] Filed: Sep. 28, 1984

[51] Int. Cl.[4] ............................................ H04N 5/06

[52] U.S. Cl. .................................... 358/150; 358/148

[58] Field of Search ............... 358/150, 148, 149, 151, 358/158, 160, 65, 66; 340/731, 749, 814, 723; 331/20, 1 A, 10

[56] References Cited

U.S. PATENT DOCUMENTS

| | | | |
|---|---|---|---|
| 3,893,174 | 7/1975 | Sano et al. | 358/65 |
| 4,144,545 | 3/1979 | Fernsler et al. | 358/158 |
| 4,193,071 | 3/1980 | Hasegawa et al. | 340/723 |
| 4,228,463 | 10/1980 | Steckler et al. | 358/158 |
| 4,251,833 | 2/1981 | Fernsler et al. | 358/148 |
| 4,283,662 | 8/1981 | Ainscow et al. | 315/364 |
| 4,351,001 | 9/1982 | McGinn et al. | 358/158 |
| 4,414,567 | 11/1983 | Berke et al. | 358/139 |
| 4,420,775 | 12/1983 | Yamazaki et al. | 360/38.1 |
| 4,491,832 | 1/1985 | Tanaka | 340/814 |
| 4,511,858 | 4/1985 | Charavit et al. | 331/10 |

FOREIGN PATENT DOCUMENTS

| | | | |
|---|---|---|---|
| 2085257 | 4/1982 | United Kingdom | 358/160 |

*Primary Examiner*—Tommy P. Chin

*Assistant Examiner*—David E. Harvey

*Attorney, Agent, or Firm*—Christensen, O'Connor, Johnson & Kindness

[57] ABSTRACT

A timing circuit adapted for use in a digital system that includes a raster scanned display device (14) adapted to scan a beam through a series of horizontal scan lines at a rate controlled by a horizontal sync signal. Each horizontal scan line comprises dots that can be individually illuminated. The time required for the beam to horizontally scan one dot is controlled by a dot clock signal. The digital system also includes means for producing row format data indicating the relationship between the horizontal sync signal and the time requried to horizontally scan one character area, and dot per character data indicating the horizontal dot width of one character area. The timing circuit comprises a generator (52) for producing a horizontal reference signal having a frequency corresponding to the desired frequency for the horizontal sync signal, and a phase lock loop for producing the horizontal sync and dot clock signals. The phase lock loop includes a frequency divider (54) for producing a character clock signal from the dot clock signal based upon the dot per character data, a controller (20) for producing the horizontal sync signal from the character clock signal based upon the row format data, and a phase control circuit (50) for producing the dot clock signal at a frequency such that the frequency of the horizontal sync signal is the same as the frequency of the horizontal reference signal.

7 Claims, 2 Drawing Figures

TIMING CIRCUIT FOR VARYING THE HORIZONTAL FORMAT OF RASTER SCANNED DISPLAY

TECHNICAL FIELD

The present invention relates to displays for digital systems and, in particular, to a timing circuit for varying the horizontal format, e.g., the number of characters per row, of the display produced by a raster scanned display device.

BACKGROUND OF THE INVENTION

Digital systems often include raster scanned display devices, such as cathode ray tube (CRT) monitors, for the display of information. In a typical raster scanned display device, a beam is scanned over a screen or other area in a series of horizontal scan lines. Information is generally displayed on the screen in a character-by-character format, where each character may be a number, an English or foreign letter, or a symbol such as a punctuation or graphics symbol. The screen is divided into a number of character areas, each character area being used to display one character. The character areas are arranged in horizontal rows, and each character area comprises dots or pixels that can be individually and selectively illuminated by the display device so as to form a particular character.

A digital system that includes a raster scanned display device typically controls the display device in part by providing a dot clock signal that has a period corresponding to the time required to horizontally scan one dot. Since the time available to scan and retrace one horizontal scan line is generally fixed, the frequency of the dot clock signal determines the horizontal dot spacing, and the horizontal dot spacing together with the dot width of the character areas determines the number of characters that may be displayed per row. In the past, if a system needed the capability of changing horizontal formats during operation, it was necessary to provide a plurality of dot clock signal generators and means for switching between them. The plurality of signal generators resulted in a greater number of parts, such as oscillators, and therefore added to the expense of the system. The additional oscillators also resulted in increased EMI and RFI problems.

SUMMARY OF THE INVENTION

The present invention provides a timing circuit for a digital display system. The timing circuit of the present invention permits the number of characters per row to be dynamically altered during operation of the system, without requiring the use of multiple dot clock signal generators.

The timing circuit of the present invention is adapted for use in a digital system that includes a raster scanned display device adapted to scan a beam through a series of horizontal lines at a horizontal scanning rate controlled by the frequency of a horizontal sync signal. Each horizontal scan line comprises dots that can be individually and selectively illuminated. The time required for the beam to horizontally scan one dot is controlled by the frequency of a dot clock signal. The digital system also includes means for producing horizontal format data indicative of the relationship between the period of the horizontal sync signal and the period of the dot clock signal. The timing circuit comprises means for generating a horizontal reference signal, and phase lock loop means for producing the horizontal sync and dot clock signals. The horizontal reference signal has a frequency corresponding to the desired frequency for the horizontal sync signal. The phase lock loop means includes means for generating the horizontal sync signal from the dot clock signal based upon the horizontal format data, and means for producing the dot clock signal at a frequency such that the frequency of the horizontal sync signal is the same as the frequency of the horizontal reference signal.

In one preferred embodiment, the digital system is adapted to display characters such that each character is positioned in a multiple dot character area. The character areas are positioned in horizontal rows of plural character areas per row. The horizontal format data includes row format data indicative of the relationship between the period of the horizontal sync signal and the time required to horizontally scan one character area. The means for generating the horizontal sync signal comprises frequency divider means and controller means. The frequency divider means is responsive to the dot clock signal for generating a character clock signal having a period corresponding to the time required for the beam to horizontally scan one character area. The controller means generates the horizontal sync signal from the character clock signal based upon the row format data.

In a further preferred embodiment, the means for producing the dot clock signal comprises phase control means including a phase comparator for producing a control signal having a voltage level corresponding to the phase difference between the horizontal sync signal and the horizontal reference signal, and a voltage controlled oscillator for producing the dot clock signal at a frequency that depends upon the voltage level of the control signal. The phase control means may also comprise a compensation circuit for varying the dot clock frequency during each horizontal scan, and a coarse tuning circuit for producing an incremental change in the frequency of the dot clock signal to enable the phase lock loop means to lock more frequency when the horizontal format data is changed.

In a further preferred embodiment, the digital system includes means for generating horizontal format signals representing a plurality of horizontal formats. The timing circuit comprises means for generating the horizontal reference signal, and dot clock means responsive to the horizontal reference signal and to the horizontal format signals for generating dot clock signals having a plurality of dot clock frequencies. Each dot clock frequency corresponds to one of said horizontal formats. The dot clock means utilizes a single reference frequency to generate the plurality of dot clock frequencies.

DETAILED DESCRIPTION OF THE INVENTION

Figure 1:
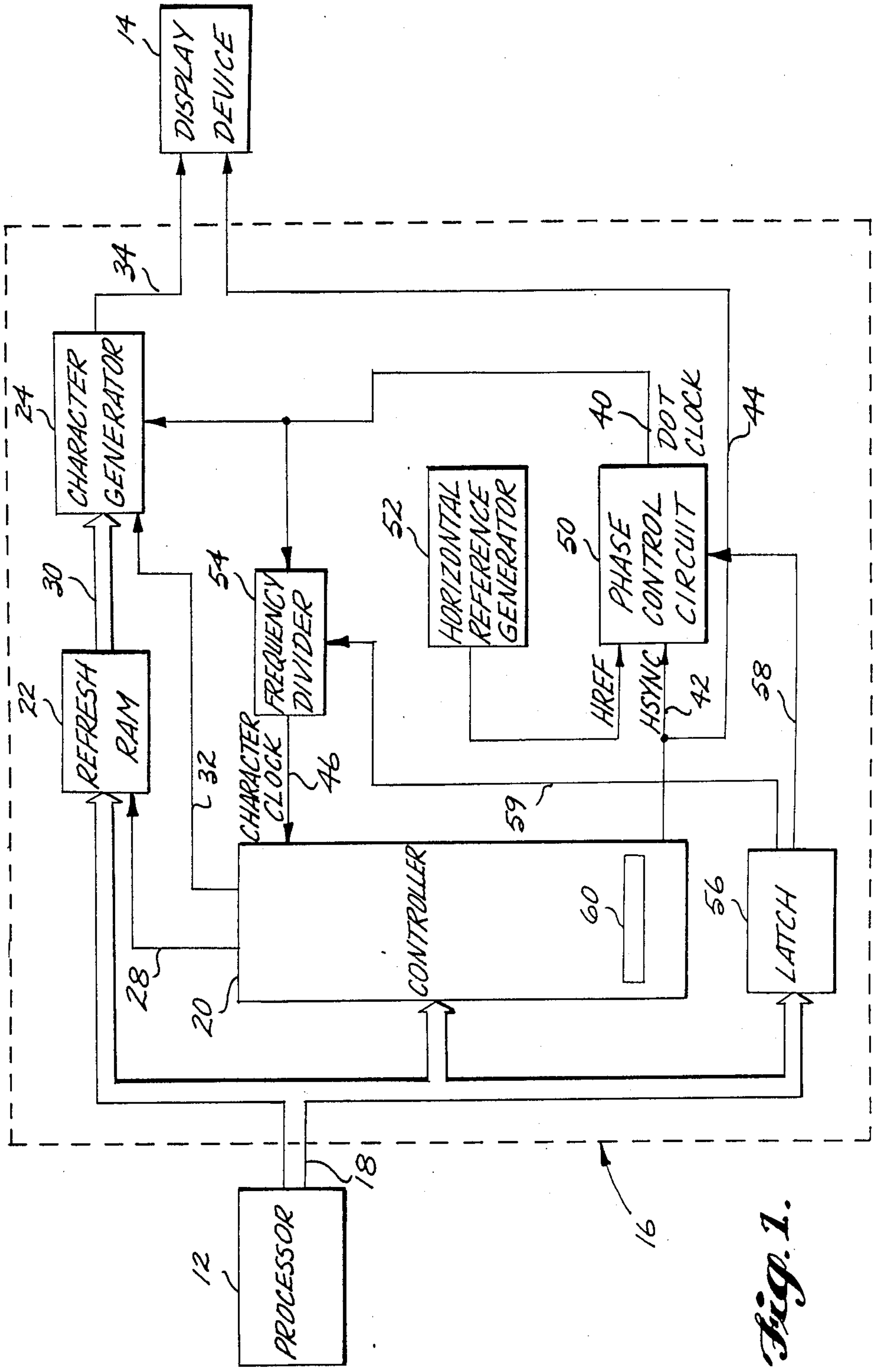
FIG. 1 is a block diagram of a digital display system that includes the timing circuit of the present invention.

FIG. 1 sets forth a block diagram of a display system that includes processor 12, raster scanned display device 14, and interface circuit 16 that includes the timing circuit of the present invention. The interface circuit functions to receive digital data from processor 12 and to cause the date to be displayed by display device 14. The interface circuit is connected to the processor by bus 18 that includes data, address and control lines. Display device 14 may comprise any raster scanned device in which a beam, such as an electron beam or a laser beam, is scanned over a screen or other area. In a common embodiment, display device 14 may comprise a conventional black and white or color monitor having a CRT and associated video and deflection circuits.

Interface circuit 16 comprises controller 20, refresh RAM 22, and character generator 24. In general, controller 20 is responsible for generating the signals necessary to control the interface circuit and display device 14. Many suitable controllers are commercially available. For the purpose of illustrating one embodiment of the present invention, it will be assusmed that controller 20 comprises the MC6845 CRT controller available from Motorola, and that display device 14 comprises a raster scanned CRT monitor.

Character data to be displayed on display device 14 is written by processor 12 into refresh RAM 22 via bus 18. Once the processor has placed the data in the refresh RAM, the remaining steps required to display the data are carried out by controller 20. In particular, controller 20 provides memory address signal 28 to the refresh RAM, and causes the memory address signal to cycle through the refresh RAM address of the data to be displayed. The refresh RAM sends data addressed by memory address signal 28 to character generator 24 over bus 30. The character generator also receives row address signal 32 from controller 20. The character generator includes a read only memory that contains the dot patterns of the characters to be displayed. The data on bus 30 is used to address the dot pattern of a particular character, and the row address signal on line 32 is used to address data representing a particular horizontal row of dots within that character. As is known to those skilled in the art, a typical graphics (as opposed to alphanumeric) system would use both the memory and row address signals to scan the refresh RAM. The addressed dot data is sent in serial form from character generator 24 to display device 14 over line 34 at a rate controlled by a dot clock signal on line 40. The dot clock signal is described in greater detail below. The timing of the memory and row address signals is controlled by a character clock signal received by controller 20 over line 46. The character clock signal is a periodic signal whose period establishes the time for horizontally scanning one character area. The frequency of the character clock signal therefore corresponds to the rate at which the controller increments the memory address signal.

Interface circuit 16 further comprises phase control circuit 50, horizontal reference generator 52, frequency divider 54 and latch 56. Controller 20 produces the horizontal sync signal (HSYNC) and the vertical sync signal (not shown) required by display device 14 to control the horizontal and vertical scanning respectively of the CRT electron beam. The HSYNC signal is sent to phasae control circuit 50 over line 42, and to display device 14 over line 44. As is well known, HSYNC is a periodic signal whose period establishes the time for the beam to scan and retrace one horizontal scan line, i.e., one horizontal line of dots. The controller produces the HSYNC signal based upon a character clock signal received from frequency divider 54 over line 46. The character clock signal is a periodic signal having a period equal to the time established for horizontally scanning one character area on the screen or other scanning area of display device 14. Therefore to generate the HSYNC signal from the character clock signal, controller 20 must have row format information specifying the relationship between the period of the horizontal sync signal and the time required to horizontally scan one character area. Such row format data is generated by processor 12 and sent to controller 20 via bus 18. The controller stores the row format data in internal register file 60. In one preferred embodiment, the data in register file 60 includes a character count number representing the number of cycles of the character clock signal in each period of the horizontal sync signal. The character count number is therefore equal to the number of character areas per row plus the number of character clock cycles in the horizontal blanking interval. Register file 60 may also include numbers specifying the number of displayed characters per row, and the position and width of the horizontal sync pulse.

Horizontal reference genertor 52 generates a horizontal reference (HREF) signal at a frequency of 15750 Hz, such that the period of the HREF signal corresponds to the desired time for the display device to scan and retrace one horizontal scan line. Phase control circuit 50 receives the HREF and HSYNC signals, and generates a dot clock signal having a period that establishes the time in which the display device horizontally scans one dot of one character area. The dot clock signal is sent to character generator 24 and to frequency divider 54. Frequency divider 54 divides the dot clock signal by a "dot per character" number corresponding to the horizontal width in dots of one character area, to produce the character clock signal on line 46. Data representing the dot per character number is written into latch 56 by processor 12 over bus 18. Latch 56 includes a first portion (i.e., group of bits) reserved for such dot per character data, and a second portion reserved for "frequency select" data. The dot per character data is provided to frequency divider 54 via line 59. The frequency select data is provided to phase control circuit 50 over line 58. The frequency select data is described in greater detail below.

Phase control circuit 50 controls the frequency of the dot clock signal such that the phase of the HSYNC signal is equal to the phase of the HREF signal. When processor 12 changes the horizontal format (e.g., the number of characters per row) by writing new row format data into register file 60 or new dot per character data into latch 56, the next pulse of the HSYNC signal will be late or early compared to the next pulse of the HREF signal. As described in greater detail below, this phase difference will cause phase control circuit 50 to adjust the frequency of the dot clock signal, and therefore of the character clock signal, in such a manner so as to cause the HREF and HSYNC signals to again have the same phase.

Figure 2:
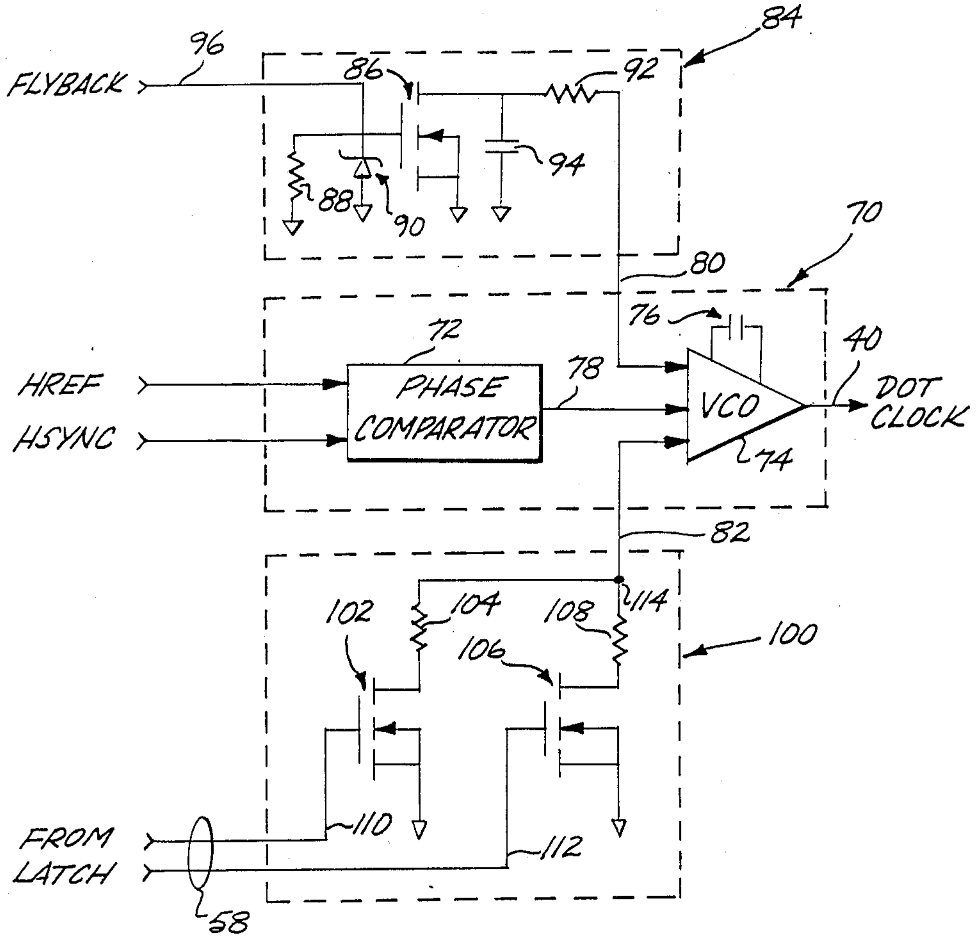
FIG. 2 is a circuit diagram of the phase control circuit of FIG. 1.

One preferred embodiment of phase control circuit 50 is set forth in FIG. 2. The phase control circuit comprises phase lock circuit 70, compensation circuit 84 and coarse tuning circuit 100. Phase lock circuit 70 comprises phase comparator 72, voltage controlled oscillator (VCO) 74, and timing capacitor 76. Phase comparator 72 receives the HREF and HSYNC signals, and generates a control signal on line 78 having a voltage level (or other suitable characteristic) corresponding to the phase difference between the HREF and HSYNC signals. VCO 74 produces a periodic (dot clock) signal on line 40, the frequency of the dot clock signal depending upon timing capacitor 76 and upon three input signals: the control signal on line 78, a compensation signal on line 80, and a coarse tuning signal on line 82. The timing capacitor and the compensation and coarse tuning signals determine the "center" of free-running frequency of VCO 74, i.e., the frequency at which the VCO will operate when phase comparator 72 provides a control signal having a "center" voltage level corresponding to a constant phase difference between the HREF and HSYNC signals. A changing phase difference between the HREF and HSYNC signals will result in a control signal at a level different from the center level that will in turn cause the VCO to deviate from its center frequency.

Referring to FIGS. 1 and 2, and for the moment ignoring the compensation and coarse tuning circuits and signals, it can be seen that phase comparator 72, VCO 74, frequency divider 54, and controller 20 comprise a phase lock loop. This phase lock loop is used to control the frequency of the dot clock signal such that the frequency of the HSYNC signal remains at 15750 Hz, despite changes in the row format data in register file 60 or in the dot per character data in latch 56. The operation of this phase lock loop can be described by imagining that the value of the character count number in register file 60 has just been increased, in order to increase the number of characters per row on display device 14. The new, larger character count number will decrease the frequency of the HSYNC signal, resulting in a control signal on line 78 to VCO 74. The control signal will cause the frequency of the dot clock signal to increase, and frequency divider 54 will respond by increasing the frequency of the character clock signal by a proportional amount. The increase in the frequency of the character clock signal will cause controller 20 to increase the frequency of the HSYNC signal. This process will continue until the frequencies of the HREF and HSYNC signals are once agains identical, and the frequency of the dot clock signal will stabilize about a new, higher value. A fully analogous process occurs when the processor changes the dot per character data (in latch 56), or when the processor simultaneously changes the row format data and the dot per character data. A suitable single chip device for phase comparator 72 and VCO 74 is the XR-210 FSK modulator/demodulator available from EXAR. A suitable value for timing capacitor 76 for use with the XR-210 circuit is 91 picofarads.

Compensation circuit 84 and coarse tuning circuit 100 are adapted for connection to the "fine tune" and "keying input" terminals, respectively, of the XR-210 circuit. Equivalent compensation and coarse tuning circuits could of course be adapted for and used with other phase lock circuits. Compensation circuit 84 comprises FET 86, resistor 88, zener diode 90, resistor 92 and capacitor 94. A flyback signal (not shown in FIG. 1) from the horizontal deflection transformer of display device 14 is connected to the gate of FET 86 by line 96. Each flyback pulse received through line 96 therefore momentarily connects the drain of FET 86 to ground, the FET drain being connected to the fine tune terminal of VCO 74 through line 80 and through a timing circuit comprising resistor 92 and capacitor 94. Zener diode 90 provides protection to the gate of FET 86, and resistor 88 serves to bleed off gate voltage after each flyback pulse. The illustrated compensation circuit functions to provide a small modification to the frequency of the dot clock signal during a horizontal scan, in order to compensate for nonlinearities that typically occur in the horizontal scan rate in a CRT display device. The compensation circuit may therefore be used to replace the function of CRT linear correction modules that are required in some applications. Suitable values for resistor 92 and capacitor 94 are 620 ohms and 0.047 microfarads, respectively.

Coarse tuning circuit 100 comprises FET 102, resistor 104, FET 106 and resistor 108. Resistor 104 is connected between the drain of FET 102 and node 114, and resistor 108 is connected between the drain of FET 106 and node 114. Node 114 is connected to the keying input terminal of VCO 74 by line 82. Line 58 from latch 56 (FIG. 1) comprises separate lines 110 and 112, line 110 being connected to the gate of FET 102, and line 112 being connected to the gate of FET 106. In one preferred embodiment, lines 110 and 112 are connected to receive two bits respectively of the frequency select data stored in latch 56 by processor 12. Therefore, such bits in latch 56 determine whether a signal is applied to the gates of either or both of FETs 102 and 106. By choosing resistors 104 and 108 to have different values, the data in latch 56 can therefore select one of four values for the effective resistance between node 114 and ground. The value of such effective resistance in turn controls the center frequency of VCO 74. Suitable values for resistors 104 and 108 are 270 ohms and 680 ohms, respectively.

Coarse tuning circuit 100 is preferably used to speed the response of phase control circuit 50 to a chanage in the row format data and/or in the dot per character data. Whenever such data is to be changed by processor 12, the processor also determines which of the center frequencies selectable through the coarse tuning circuit is closet to the center frequency that will be required for the dot clock signal after the data has been changed. The processor then updates the frequency select data in latch 56 at the time that it updates the row format and/or dot per character data. As a result of the new frequency select data in latch 56, the dot clock frequency will change by an incremental amount, therefore causing the phase lock loop to lock more quickly.

While the preferred embodiments of the invention have been illustrated and described, it should be understood that variations will be apparaent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A timing circuit for a digital system that includes a raster scanned display device that includes a horizontal deflection transformer, the display device being adapted to scan a beam through a series of horizontal scan lines at a horizontal scanning rate controlled by a periodic horizontal sync signal having a first period, each horizontal scan line comprising dots that can be individually and selectively illuminated in response to data provided at a rate controlled by a periodic dot clock signal having a second period, the digital system further including means for producing horizontal format data that represents a desired relationship between the first and second periods, the timing circuit comprising:

means for generating a periodic horizontal reference signal having a third period; and phase lock loop means for producing the horizontal sync signal and the dot clock signal, the phase lock loop means including means for generating the horizontal sync signal from the dot clock signal based upon the horizontal format data, and control means connected to receive the horizontal sync signal and the horizontal reference signal and to produce the dot clock signal such that the first period is the same as the third period, whereby the desired relationship between the first and second periods is produced, the control means comprising phase control means and a voltage controlled oscillator, the phase control means including a phase comparator for receiving the horizontal sync signal and the horizontal reference signal and for producing a control signal having a voltage level corresponding to a phase difference between the horizontal sync and horizontal reference signals, and a compensation circuit responsive to a flyback signal from the horizontal deflection transformer for producing a compensation signal having a period corresponding to the horizontal scanning rate, the voltage controlled oscillator being connected to receive the control and compensation signals and to produce the dot clock signal, the voltage controlled oscillator including means for responding to said voltage level by producing the dot clock signal having the second period, and means for responding to the compensation signal by varying the second period during each horizontal scan line so as to compensate for nonlinearities in the horizontal scanning rate of the display device.

2. The timing circuit of claim 1, wherein the digital system is adapted to display characters such that each character is positioned in a multiple dot character area having a selected number of dots along one of the horizontal scan lines, the character areas being positioned in horizontal rows of plural character areas per row, and wherein the means for generating the horizontal sync signal comprises frequency divider means responsive to the dot clock signal for generating a periodic character clock signal having a period equal to the second period times said selected number, and controller means for generating the horizontal sync signal from the character clock signal based upon the horizontal format data.

3. The timing circuit of claim 2, wherein the horizontal format data includes character count data indicative of a sum of the number of character areas per row plus a number of character areas representing a blanking interval between successive rows.

4. The timing circuit of claim 3, wherein the controller means comprises register means for storing the character count data.

5. The timing circuit of claim 1, wherein the compensation circuit comprises a field effect transistor having a drain coupled to the voltage controlled oscillator through a resistor and coupled to ground through a capacitor.

6. A timing circuit for a digital system that includes a raster scanned display device adapted to scan a beam through a series of horizontal scan lines at a horizontal scanning rate controlled by a periodic horizontal sync signal having a first period, each horizontal scan line comprising dots that can be individually and selectively illuminated in response to data provided at a rate controlled by a periodic dot clock signal having a second period, the digital system further including means for producing horizontal format data that represents a desired relationship between the first and second periods, the timing circuit comprising:

means for generating a periodic horizontal reference signal having a third period; and phase lock loop means for producing the horizontal sync signal and the dot clock signal, the phase lock loop means including means for generating the horizontal sync signal from the dot clock signal based upon the horizontal format data, and control means connected to receive the horizontal sync signal and the horizontal reference signal and to produce the dot clock signal such that the first period is the same as the third period, whereby the desired relationship between the first and second periods is produced, the control means comprising phse control means and a voltage controlled oscillator, the phase control means including a phase comparator for receiving the horizontal sync signal and the horizontal reference signal and for producing a control signal having a voltage level corresponding to a phase difference between the horizontal sync and horizontal reference signals, and selection means comprising latch means for storing frequency select data representing a desired center frequency for the voltage controlled oscillator, and conversion means for converting the frequency select data in the latch means into a corresponding selection signal, the voltage controlled oscillator being connected to receive the control and selection signals, the voltage controlled oscillator including means for responding to the selection signal by operating at a corresponding center frequency, and means for responding to said voltage level by varying the second period.

7. The timing circuit of claim 6, wherein the latch means includes a plurality of output terminals and means for providing the frequency select data on said output terminals, and wherein the conversion means comprises and FET and a resistor serially connected between each output terminal of the latch means and a common node at which the selection signal is produced.

* * * * *

UNITED STATES PATENT AND TRADEMARK OFFICE
CERTIFICATE OF CORRECTION

PATENT NO. : 4,686,567

DATED : August 11, 1987

INVENTOR(S) : William S. Burdick

It is certified that error appears in the above-identified patent and that said Letters Patent is hereby corrected as shown below:

Abstract, Line 10, "requried" should be --required--

Column 3, Line 17, "assusmed" should be --assumed--

Column 4, Line 21, "genertor" should be --generator--

Column 5, Line 39, "agains" should be --again--

Column 6, Line 31, "chanage" should be --change--

Column 6, Line 36, "closet" should be --closest--

Column 8, Line 31, "phse" should be --phase--

Column 8, Line 54, "and" should be --an-- (1st occurrence)

Signed and Sealed this

Ninth Day of February, 1988

*Attest:*

DONALD J. QUIGG

*Attesting Officer*

*Commissioner of Patents and Trademarks*